May 22, 1923.
H. SUMMERFIELD
ADJUSTABLE ANTISKIDDING DEVICE
Filed Nov. 5, 1920
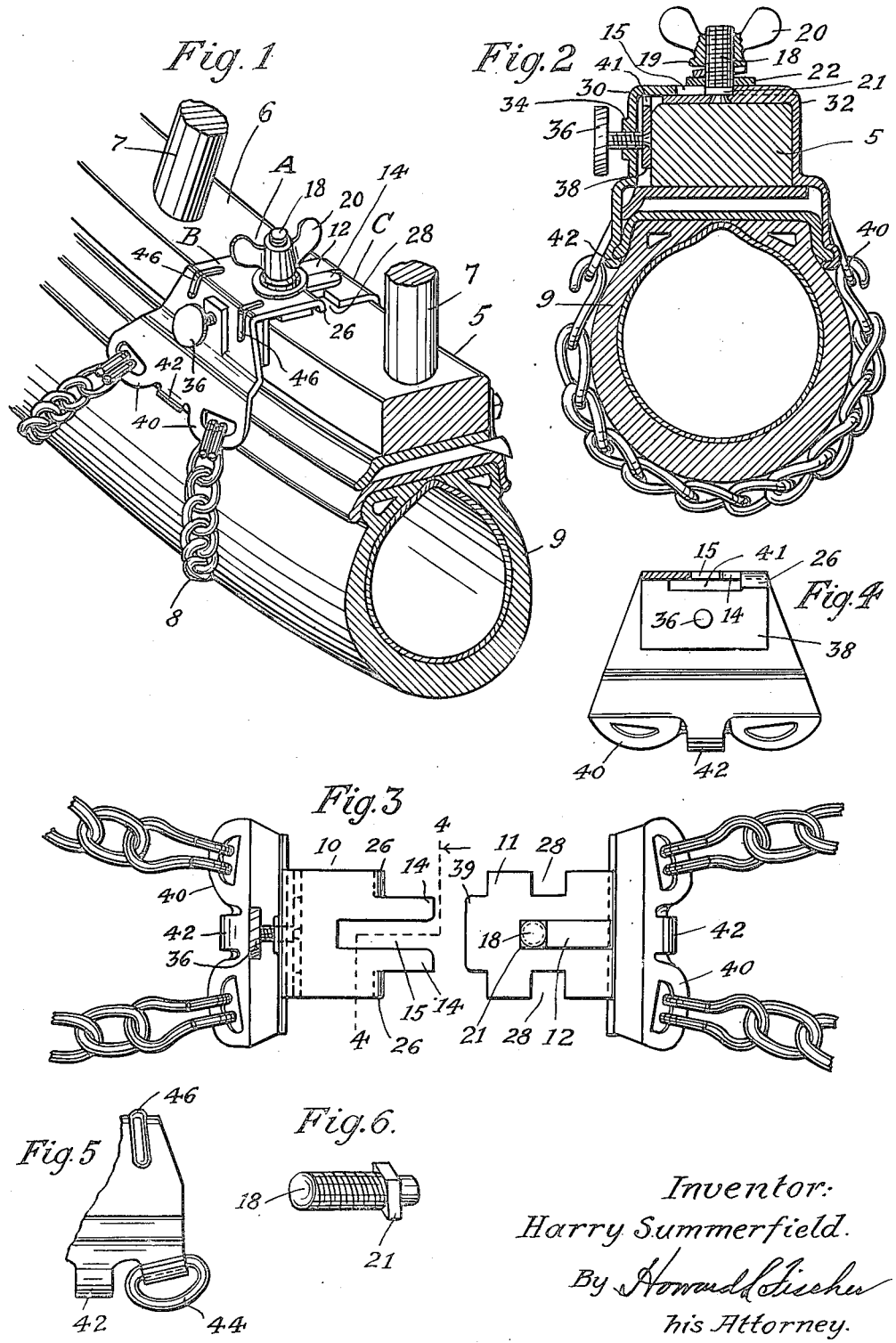
Inventor:
Harry Summerfield.
By Howard L. Fischer
his Attorney.

Patented May 22, 1923.

1,456,473

UNITED STATES PATENT OFFICE.

HARRY SUMMERFIELD, OF ST. PAUL, MINNESOTA.

ADJUSTABLE ANTISKIDDING DEVICE.

Application filed November 5, 1920. Serial No. 421,994.

*To all whom it may concern:*

Be it known that I, HARRY SUMMERFIELD, a citizen of the United States, residing at St. Paul, in the county of Ramsey and State of Minnesota, have invented a new and useful Improvement in Adjustable Antiskidding Devices, of which the following is a specification.

My invention relates to antiskidding devices for tires, especially adapted for vehicle wheels with pneumatic tires, and has for its object to provide clamping means for securing a chain or other flexible device to the felly of the vehicle wheel for preventing skidding and increasing the tractive power thereof.

The main object is to provide a clamp which may be quickly applied or removed and which when applied is securely held to the felly of a wheel. In carrying out my invention I provide a clamp comprising two interlocking portions adapted to engage the felly on both sides, provision being made for detachably securing the tread chain so that the same may be disengaged therefrom if broken or worn out. The invention further consists in the provision of means for adjusting the clamp to different sized fellies and means for tightening or rigidly clamping the same to the felly.

The full objects and advantages of my invention will appear in connection with the detailed description thereof and are particularly pointed out in the claims.

In the drawings, illustrating the application of my invention in one form:

Fig. 1 is a perspective view of a portion of a motor vehicle wheel illustrating the device attached thereto as it would appear in use.

Fig. 2 is a transverse section through the lower portion of the wheel showing my device in side elevation thereof.

Fig. 3 is a top plan view of the device removed from the felly illustrating the interlocking ends separated from each other.

Fig. 4 is a sectional view taken on the line 4—4 of Fig. 3.

Fig. 5 is a side elevation of an alternative construction.

Fig. 6 illustrates the clamp bolt.

The drawings illustrate an antiskidding device, the clamp A of which is adapted to be attached to the felly 5 of a vehicle wheel 6, only a portion of the wheel being shown in Fig. 1. The clamp A is adapted to hold an antiskid or cross chain 8 across the tread of the tire 9 and is positioned between the spokes 7. The clamp A comprises two angular members B and C having overlapping ends which are adapted to interlock with each other when the members B and C are clamped together by means of a bolt 18 to be described later. The angular members B and C correspond substantially in shape and preferably are formed from sheet metal plates which are bent to conform to the shape of the felly and when assembled are applied to the opposite sides of the felly. A horizontal guide 12 is formed on the member 11 by raising a portion of the metal thereof along the medial line and is adapted to enter the slot 15 in the bifurcated end of the member 10 by means of which the members are held in alignment with each other while being clamped to a wheel felly. The members B and C are clamped together by means of the bolt 18 which passes through the plate 10, the wing nut 20 being threaded on to the screw 19 to hold the plates in contact at the same time permitting one plate to slide upon the other to increase or decrease the width of the clamp. A washer 22 is interposed between the wingnut 20 and the overlapping plate 10 to form locking means for the thumb nut when the same is tightened up to hold the clamps against relative movement. The end of the bolt which passes through the plate 11 is upset to effectually prevent its displacement. The bolt is provided with a square portion 21 which is spaced from the end thereof and which slidingly engages between the tongues 14—14 to prevent it from turning when the nut is tightened.

A pair of oppositely disposed lugs 26 are formed on the member 10 by having a portion of the metal along the opposite edges stamped out and struck inwardly. These lugs project into notches 28 in the opposite edges of the plate 11 for limiting the relative movement of the plates 10 and 11.

The members B and C have portions 30 and 32 which extend at right angles to the portions 10 and 11 respectively and which lie parallel to each other when the portions 10 and 11 are rigidly clamped together. When it is desired to attach the clamp A to the felly of a wheel the thumb-nut 20 is loosened and the members B and C are drawn together with a space between their parallel sides 30 and 32 equal to the width of the felly to which they are being attached. The portion 30 of the member 10 has a bar or plate 34 rigidly secured transversely across the outer face of the same on which a thumb screw 36 is threaded, having swivelly connected to its inner end an engaging plate 38. The engaging plate 38 is rectangular in shape and is approximately of the same width as the member 30. When the clamp A is adjusted to the width of the felly and the members 10 and 11 are rigidly clamped together by the thumb nut 20, the clamping device can be rigidly clamped to the felly by turning the thumb screw 36 and causing the engaging plate 38 to engage the felly 5 and pinch the same between the portion 32 and the engaging plate 38. The bar or plate 34 can be attached to the portion 30 in any suitable manner, such as welding or riveting or may be formed integral with the portion 30 if it is desired, the function of the member being to provide means for holding the threaded thumb screw 36 in position. A protecting means such as leather or any suitable means may be placed against the inner surface of the clamp to protect the portion of the felly engaged thereby if it is desired.

The end of the plate 11 is provided with a tongue 39 which enters a notch 41 in the upper edge of the engaging plate 38. This construction allows the engaging plate 38 to be moved inwardly to engage the felly 7 when the overlapping plates 10 and 11 are brought together so that the end of the plate 11 abuts against the inner side of the member 30.

The members B and C are provided with oppositely disposed apertured ears 40 for engagement with the end loops of the cross chain for detachably holding the same in proper position upon the tread. The ears 40 project outwardly to facilitate the attachment of the chain 8 thereto for the purpose of making repairs. Between the ears 40 is a claw 42 projecting outwardly and curved to conform to the outside contour of the tire rim. It will be understood, however, that in case the wheel is provided with a rim having different form from that shown the shape of the claw may be modified to conform to it. The members B and C being preferably stamped out of sheet metal, the angular portions are formed with stiffening ribs 46 for the purpose of stiffening the same.

In Fig. 5 is shown a slightly modified form of my invention. This construction is provided with lugs 44, preferably D shaped which are pivotally mounted on the members B and C respectively for engagement with the terminal ends of the cross chain.

The operation and advantages of my invention are obvious from the foregoing description. The clamp A is provided with means for attachment for different sized fellies and means for tightening or rigidly clamping the same to a felly. One or more of the devices can be used upon a wheel and can be readily applied and removed. It will be seen that the device is a simple and efficient and yet a durable form of antiskidding device, applicable to any form of automobile rims and constructed and arranged so as not to damage the tire of the wheel.

In accordance with the patent statutes I have described the principles of operation of my invention together with the device which I now consider to represent the best embodiment thereof, but I desire to have it understood that the construction shown is only illustrative and that the invention can be carried out by other means and applied to uses other than those above set forth, within the scope of the following claims.

I claim:

1. An adjustable antiskidding device for vehicle wheels comprising a pair of clamping members having overlapping ends, means adapted to secure said ends together, rim engaging claws formed on said members, anti-skidding means positioned on either side of said claws on each of said members, and a felly engaging means attached to the side of one of said members adapted to adjustably engage the felly to rigidly clamp said members thereto.

2. An adjustable clamping device including a pair of plate-like members adapted to engage the felly of a wheel, clamping ends formed on said members, one of said ends being bifurcated, a guide formed on the other of said ends adapted to be engaged by the bifurcated end of the first member to hold said members in alignment with each other while being clamped to a wheel felly, stop lugs formed adjacent to the bifurcated end of one of said members, notches adapted to be engaged by said lugs formed in the end of the other of said members when said ends are overlapped and clamped to a felly, and means for adjustably clamping said members to a felly.

3. An adjustable clamping device including plate-like members having overlapping ends, notches formed in one of said ends, lugs formed on the other of said ends adapted to engage in said notches, means for clamping said ends together, an adjustable felly engaging member adapted to clamp said members rigidly to a wheel felly, and means for securing antiskidding means to said members.

4. An adjustable antiskidding means comprising a pair of angular members having overlapping ends, means for clamping said ends together, stop means associated with said ends adapted to limit their separating moment, take-up means associated with one of said members adapted to rigidly and adjustably clamp said members to a felly, and antiskidding means associated with said members.

5. An adjustable antiskidding attachment for vehicle wheels comprising angular integral plate-like members, antiskid engaging loops formed integral with the free ends of said attachment, rim engaging lugs positioned between said loops, a bifurcated end formed in one of said members adapted to overlap the end of the other of said members, means adapted to attach said members together to hold them in overlapping position, depending lugs formed on said bifurcated end and lug engaging notches formed in the overlapping end of the other of said members, said lugs and notches forming stops to limit the separating movement of said members, and felly engaging means associated with one of said members adapted to take up the slack and rigidly attach said attachment to a wheel felly.

6. An anti-skid device comprising a pair of overlapping members formed of sheet metal, a pair of oppositely positioned notches formed along the outer edges of one of said members, a pair of downwardly bent over lugs formed on the other of said members adapted to engage said first member within said notches and means for holding said members together.

HARRY SUMMERFIELD.